United States Patent
Numata et al.

[11] Patent Number: 5,250,968
[45] Date of Patent: Oct. 5, 1993

[54] IMAGE PROJECTING UNIT

[75] Inventors: Kiyoshi Numata, Kanagawa; Toshio Maruyama, Tokyo; Ryuichi Okumura, Kanagawa, all of Japan

[73] Assignee: Sony Corporation, Tokyo, Japan

[21] Appl. No.: 888,868

[22] Filed: May 27, 1992

[30] Foreign Application Priority Data

May 30, 1991 [JP] Japan .................. 3-126430

[51] Int. Cl.⁵ .................................. H04N 5/74
[52] U.S. Cl. ..................... 353/101; 358/60; 358/231; 353/122
[58] Field of Search ............... 353/122, 100, 101, 74, 353/75, 76, 79; 358/62, 60, 234, 233, 231, 250

[56] References Cited

U.S. PATENT DOCUMENTS

| | | | |
|---|---|---|---|
| 3,891,314 | 6/1975 | Lakin et al. | 353/101 |
| 4,151,554 | 4/1979 | Tucker | 358/60 |
| 4,306,783 | 12/1981 | Murray | 353/122 |
| 4,401,368 | 8/1983 | Drechsel et al. | 359/452 |
| 4,609,945 | 9/1986 | Oguino | 358/233 |
| 4,646,143 | 2/1987 | Watanabe et al. | 358/60 |
| 4,651,217 | 3/1987 | Yamazaki | 358/60 |
| 4,729,031 | 3/1988 | Saito et al. | 358/60 |
| 4,810,075 | 3/1989 | Fukuda | 353/77 |
| 4,982,289 | 1/1991 | Mitani et al. | 358/231 |
| 5,045,930 | 9/1991 | Hasegawa | 353/101 |
| 5,168,351 | 12/1992 | Bradley et al. | 358/231 |

Primary Examiner—William A. Cuchlinski, Jr.
Assistant Examiner—William C. Dowling
Attorney, Agent, or Firm—Lewis H. Eslinger; Jay H. Maioli

[57] ABSTRACT

An image projecting unit is shown which comprises a structure having a display surface on which a visual image is displayed, and a lens assembly movably arranged in front of the display surface of the structure. The lens assembly has a rearmost lens which faces the display surface. A bellows is disposed between the display surface and the rearmost lens to define therebetween a sealed space, and a liquid is contained in the sealed space to optically connect the display surface and the rearmost lens.

16 Claims, 6 Drawing Sheets

IMAGE PROJECTING UNIT

BACKGROUND OF THE INVENTION

1. Field of the Invention

The present invention relates in general to projectors which throw images on a screen, and more particularly to projectors of a type which have three image projecting units from which three primary color images are projected to form a visual color image on a screen. More specifically, the present invention is concerned with an improvement in the image projecting unit.

2. Description of the Prior Art

In order to clarify the task of the present invention, one conventional projector of the above-mentioned type will be described with reference to FIGS. 7 and 8 of the accompanying drawings.

As is seen from FIG. 7, the conventional projector comprises generally three cathode ray tubes (CRT) "a", "b" and "c" on which three primary color images provided by a common image information are displayed respectively, and three lens assemblies "e", "f" and "g" through which the respective three primary color images are projected forward to produce a visual color image on a screen "d". Each cathode ray tube "a", "b" or "c" and its associated lens assembly "e", "f" or "g" thus constitute an image projecting unit "A", "B" or "C".

In order to focus the three primary color images on a common area of the screen "d", the three image projecting units "A", "B" and "C" are suitably inclined with respect to the screen "d", as shown.

Although not shown in FIG. 7, a liquid is placed between each cathode ray tube "a", "b" or "c" and the associated lens assembly "e", "f" or "g" for optically connecting these two devices.

In the projectors of this type, when the size of the screen "d" is changed, the convergence angle "$\theta 1$", of each lens assembly "e", "f" or "g" should be changed. Thus, it becomes necessary to change the setting angle "$\theta 2$" of each cathode ray tube "a", "b" or "c" relative to the associated lens assembly "e", "f" or "g".

Japanese Utility Model Provisional Publication 1-115145 shows one of the image projecting units used in the above-mentioned projectors, which is illustrated in FIG. 8 of the accompanying drawings.

As is seen from FIG. 8, the image projecting unit comprises a cathode ray tube 1 having an annular spacer 2 secured thereto. An O-ring 8 is disposed between the cathode ray tube 1 and the spacer 2. Designated by numeral 3 is a rearmost lens of a lens assembly which is arranged in the front of the cathode ray tube 1 and has an annular spacer 4 secured thereto. Another O-ring 9 is disposed between the lens 3 and the spacer 4. Compressed between the spacers 2 and 4 is an annular rubber tube 5 which serves as a part of a liquid container.

Within a circular space 6 defined by the annular rubber tube 5 and the two spacers 2 and 4, there is contained a liquid for achieving an optically good connection between the cathode ray tube 1 and the lens 3.

Designated by numerals 7 and 7 are angle adjusting bolts which extend between peripheral portions of the respective spacers 2 and 4. Each adjusting bolt 7 has a spring disposed thereabout between the spacers 2 and 4.

Thus, when, as is seen from the drawing, one or some of the adjusting bolts 7 and 7 are screwed to advance forward, the setting angle of the cathode ray tube 1 relative to the lens 3 is changed. Under this angled condition, a part of the annular rubber tube 5 is resiliently deformed as shown.

However, due to inherent construction, the usage of the annular rubber tube 5 has hitherto failed to provide the cathode ray tube 1 with a sufficiently large angle relative to the lens 3. In fact, the largest angle of the cathode ray tube 1 relative to the lens 3 is achieved only by strongly compressing one part of the rubber tube 5.

SUMMARY OF THE INVENTION

It is therefore an object of the present invention to provide a projector which is free of the above-mentioned drawback.

According to a first aspect of the present invention, there is provided an image projecting unit which comprises a structure having a display surface on which a visual image is displayed; a lens assembly movably arranged in front of the display surface of the structure, the lens assembly having a rearmost lens which faces the display surface; a bellows disposed between the display surface and the rearmost lens to define therebetween a sealed space; and liquid contained in the sealed space to optically connect the display surface and the rearmost lens.

According to a second aspect of the present invention, there is provided an image projecting unit which comprises a first structure having a display surface on which a visual image is displayed; a second structure having an opening formed therethrough, the second structure being secured to the first structure in such a manner that the display surface is exposed through the opening; a third structure positioned in front of the second structure and being movable in a fore-and-aft direction relative to the second structure; a fourth structure universally pivotally connected to the third structure; a lens assembly mounted to the fourth structure in such a manner that a rearmost lens thereof faces the display surface through the opening of the second structure; a bellows assembly disposed between the second and fourth structures to defined a sealed space to which the display surface and the rearmost lens are exposed; a liquid contained in the sealed space to optically connect the display surface and the rearmost lens; and driving means for pivoting the fourth structure in universal directions relative to the third structure.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
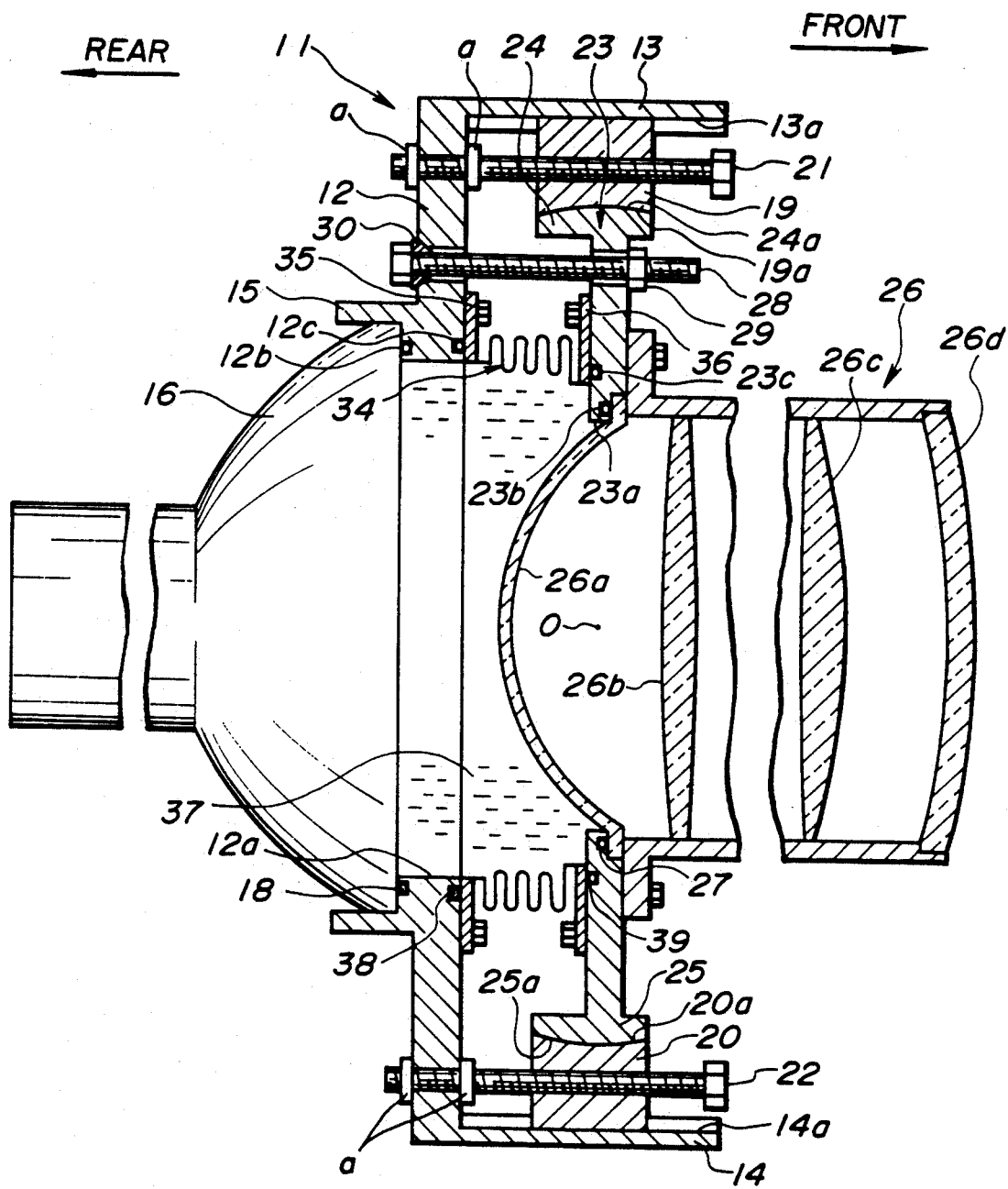
FIG. 1 is a sectional view of an image projecting unit according to the present invention.
Figure 2:
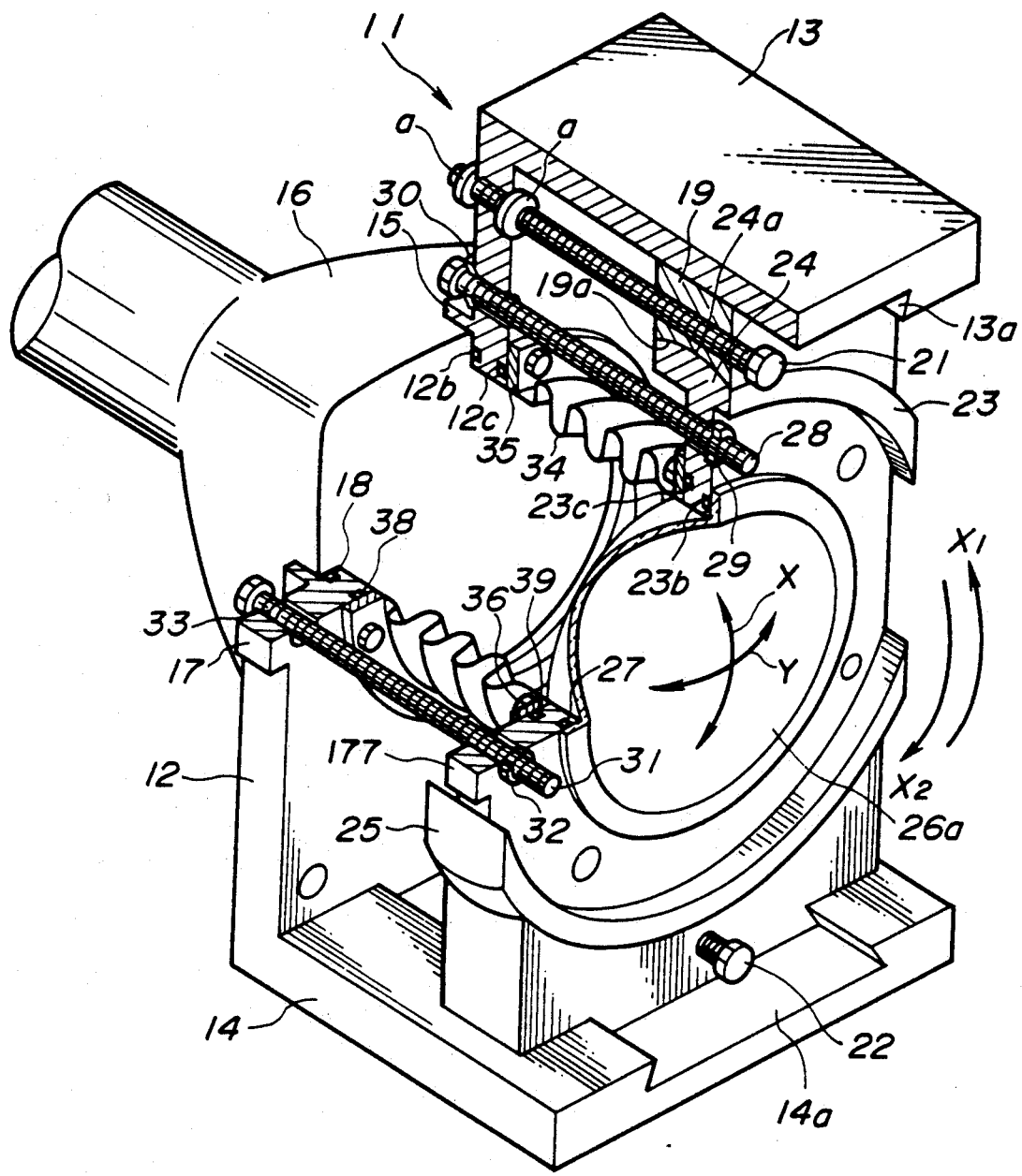
FIG. 2 is a perspective view of the image projecting unit of the present invention with some parts shown in cross-section.

Referring to FIGS. 1 and 2, there is shown a projecting unit employed in a projector according the present invention.

In the drawings, denoted by numeral 11 is a first holder which supports a cathode ray tube 16 (which will be referred to as "CRT" hereinafter).

The first holder 11 comprises a base plate 12 which has a circular opening 12a formed therethrough. First and second annular grooves 12b and 12c are formed on back and front surfaces of the base plate 12 in a manner to surround the circular opening 12a. The base plate 12 has forwardly extending upper and lower plate portions 13 and 14 integral therewith. Each plate portion 13 or 14 is formed at an inside surface thereof with a guide groove 13a or 14a.

The base plate 12 is integrally formed at the back surface thereof with a rectangularly extending flange 15 which surrounds the first annular groove 12b. Within the rectangularly extending flange 15, there is tightly disposed a front rectangular part of the CRT 16.

As is understood from FIG. 2, the base plate 12 is integrally formed at its one side with a first holding projection 17.

Referring back to FIG. 1, the first annular groove 12b receives a first O-ring 18 by which a sealed connection between the rectangular front part of the CRT 16 and the base plate 12 is achieved.

Designated by numerals 19 and 20 are upper and lower sliders which are slidably engaged with the guide grooves 13a and 14a, as is seen from FIG. 2. The upper and lower sliders 19 and 20 have respectively semicircular concave spherical recesses 19a and 20a whose bottom surfaces, when the two sliders 19 and 20 stand properly, constitute partially a spherical surface which has an optical center at "O".

Designated by numerals 21 and 22 are first and second adjusting bolts which are used for adjusting a fore-and-aft position of an aftermentioned lens assembly 26 relative to the CRT 16. The lens assembly 26 is of a backfocus lens "BFL". Each bolt 21 or 22 has a front end portion which is threadedly engaged with a threaded bore (no numeral) formed in a laterally middle part of the upper or lower slider 19 or 20 and a rear end portion which is rotatably received in a bore (no numeral) formed in a laterally middle part of the upper or lower part of the base plate 12.

As is seen from FIG. 1, each adjusting bolt 21 or 22 has two C-rings "a" and "a" by which the axial displacement of the adjusting bolt 21 or 22 relative to the base plate 12 is suppressed while permitting rotation of the adjusting bolt 21 or 22 about its axis relative to the base plate 12. Thus, when the adjusting bolts 21 and 22 are turned about the respective axes thereof, the upper and lower sliders 19 and 20 are moved forward or rearward along the respective guide grooves 13a and 14a of the upper and lower plate portions 13 and 14 of the base plate 12.

Designated by numeral 23 is a second holder which is circular in shape and pivotally held by the upper and lower sliders 19 and 20. The second holder 23 has at its central area a circular opening 23a formed therethrough.

As is seen from FIG. 2, the second holder 23 has at its one side a second holding projection 177 which faces the aforementioned first holding projection 17 of the base plate 12. The circular second holder 23 has upper and lower guided portions 24 and 25 whose outer peripheral surfaces constitute convex spherical surfaces 24a and 25a which are slidably mated with the aforementioned concave spherical recesses 19a and 20a of the upper and lower sliders 19 and 20.

Thus, the second holder 23 can pivot or swing in every direction relative to the upper and lower sliders 19 and 20.

As is seen from FIG. 1, the second holder 23 is formed at its front and rear surfaces with annular grooves 23b and 23c which surround the circular opening 23a.

A lens assembly 26 consisting of a plurality of lenses 26a to 26d is fixed to the second holder 23 in such a manner as will be understood from the following.

Designated by numeral 27 is a second O-ring which is received in the annular groove 23b to achieve a sealed connection between the rearmost lens 26a and the second holder 23.

Designated by numeral 28 is a third adjusting bolt which is used for adjusting a so-called vertical (or elevation) angle of the lens assembly 26, that is, the angle of the axis of the lens assembly 26 relative to an imaginary horizontal plane.

As is best seen from FIG. 1, the third adjusting bolt 28 has a front end portion loosely received in a bore (no numeral) formed in the upper portion of the second holder 23 and a rear end portion loosely received in a bore (no numeral) formed in the upper portion of the base plate 12. The third adjusting bolt 28 has an enlarged head which is in contact with a spherical washer 30 tightly put in the bore of the base plate 12. The third adjusting bolt 28 has at its front end portion a nut 29 threadedly engaged therewith.

As is seen from FIG. 2, designated by numeral 31 is a fourth adjusting bolt which is used for adjusting a so-called horizontal angle of the lens assembly 26, that is, the angle of the axis of the lens assembly 26 relative to an imaginary vertical plane.

The fourth adjusting bolt 31 has a front end portion loosely received in a bore (not shown) formed in the second holding projection 177 of the second holder 23 and a rear end portion loosely received in a bore (no numeral) formed in the first holding projection 17 of the base plate 12. The fourth adjusting bolt 31 has an enlarged head which is in contact with a spherical washer 33 tightly put in the bore of the base plate 12. The fourth adjusting bolt 31 has at its front end portion a nut 32 threadedly engaged therewith.

As is best understood from FIG. 1, resiliently disposed between the base plate 12 and the second holder 23 is a bellows assembly 34. The bellows 34a of the assembly 34 is constructed of a resiliently deformable metal, such as steel, stainless steel, phosphor bronze, berylium or the like.

Due to provision of the accordionlike walls, the bellows assembly 34 can exhibit an excellent heat radiation effect. Usage of metal as the material of the bellows 34a can promote such heat radiation effect.

However, if desired, the bellows 34a may be constructed of a resilient plastic, such as polyethylene terephthalate, polypropylene, and the like. In this case, the plastic bellows 34a must exhibit excellent durability against heat, water, ethleneglycol and glycerine.

Figure 3:
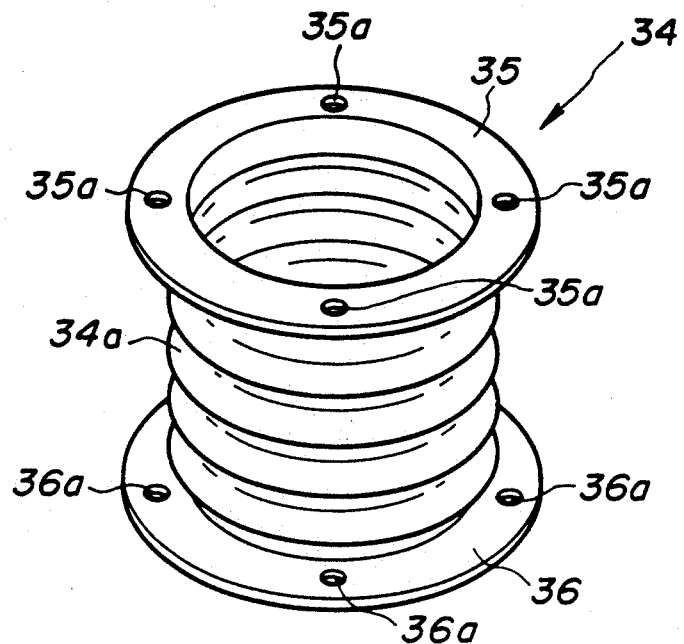
FIG. 3 is a perspective view of a bellows assembly used in the present invention.

As is seen from FIG. 3, the metal bellows 34a has front and rear ends to which annular mounting flanges 36 and 35 are welded respectively. Each flange 36 or 35 is formed with four equally spaced openings 36a or 35a.

Referring back to FIG. 1, the flanges 36 and 35 of the bellows assembly 34 are respectively secured to the second holder 23 and the base plate 12 by means of connecting screws (no numerals) which pass through the openings 36a and 35a of the flanges 36 and 35. A third O-ring 38 is received in the second annular groove 12c of the base plate 12 to achieve a sealed connection between the flange 35 and the base plate 12, and a fourth O-ring 39 is received in the annular groove 23b of the second holder 23 to achieve a sealed connection between the flange 36 and the second holder 23.

Thus, as is seen from FIG. 1, there is defined a sealed space by the rectangular front surface of the CRT 16, the circular opening 12a of the base plate 12, the bellows 34a and the rearmost lens 26a. The sealed space is filled with an optically connecting liquid 37.

It is to be noted that the bellows 34a should be of a metal material of sufficient stiffness that it can stably support the liquid 37 without being deformed due to the weight of the liquid.

In FIG. 2, the directions in which the second holder 23 is pivoted upon manipulation of the third adjusting bolt 28 are indicated by the arrow "X", while, the directions in which the second holder 23 is pivoted upon manipulation of the fourth adjusting bolt 31 are indicated by the arrow "Y".

Thus, by manipulating the third and fourth adjusting bolts 28 and 31, the angular position of the lens assembly 26 relative to the CRT 16 is adjustable.

That is, when the head of the third adjusting bolt 28 is manipulated to turn the bolt 28 in either direction, the second holder 23 is forced to pivot about a horizontal axis in one of the directions of the arrow "X", which axis extends through the optical center "O" (see FIG. 1). During this pivoting, the bellows 34a is resiliently deformed and at the same time the upper and lower convex spherical surfaces 24a and 25a of the second holder 23 are forced to slide in the semicircular concave spherical recesses 19a and 20a of the upper and lower sliders 19 and 20. It is to be noted that the bore formed in the second holding projection 177 for receiving the fourth adjusting bolt 31 is so sized as to permit such pivoting of the second holder 23.

Due to the pivoting of the second holder 23, the lens assembly 26 secured thereto is also pivoted in the same direction.

While, when the head of the fourth adjusting bolt 31 is manipulated to turn the bolt 31 in either direction, the second holder 23 is forced to pivot about a vertical axis in one of the directions of the arrow "Y", which axis extends through the optical center "O". During this pivoting, the bellows 34a is resiliently deformed and at the same time the upper and lower convex spherical surfaces 24a and 25a of the second holder 23 are forced to slide in the semicircular concave spherical recesses 19a and 20a of the upper and lower sliders 19 and 20. It is to be noted that the bore formed in the second holder 23 for receiving the third adjusting bolt 28 is so sized as to permit such pivoting of the second holder 23.

Due to the pivoting of the second holder 23, the lens assembly 26 secured thereto is also pivoted in the same direction.

In the following, the fore-and-aft positioning of the lens assembly 26 relative to the CRT 16 will be described.

When the first and second adjusting bolts 21 and 22 are manipulated to turn about respective axes thereof, the upper and lower sliders 19 and 20 are moved forward or rearward along the respective guide grooves 13a and 14a of the upper and lower plate portions 13 and 14 of the base plate 12. During this, the bellows 34a is expanded or contracted permitting such displacement of the upper and lower sliders 19 and 20.

Figure 4A:
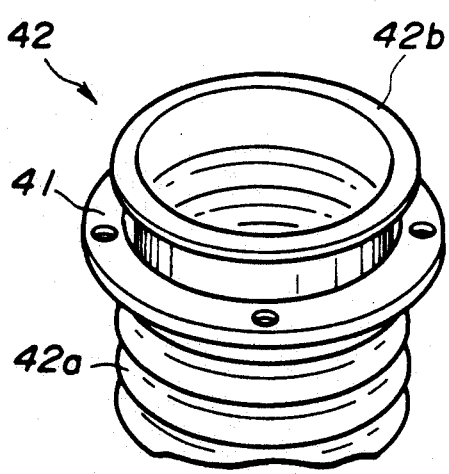
FIG. 4A is a perspective view of another bellows assembly which is also usable in the present invention.
Figure 4B:
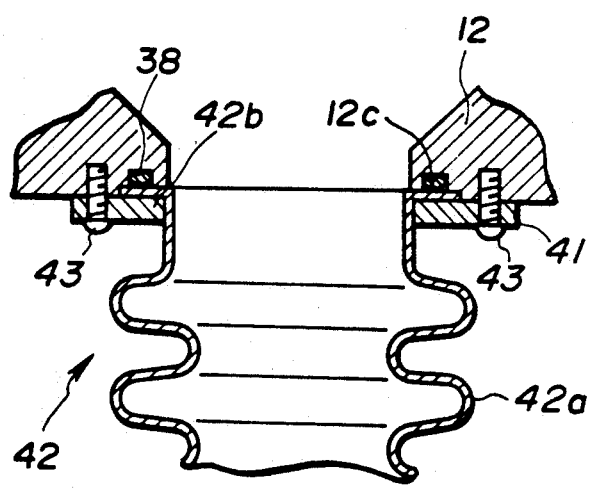
FIG. 4B is a sectional view of the bellows assembly of FIG. 4A.

Referring to FIGS. 4A and 4B, there is shown another bellows assembly 42 which is usable in the present invention in place of the above-mentioned bellows assembly 34.

In this bellows assembly 42, separate annular mounting rings 41 (only one is shown) are used, and the metal bellows 42a has at its both ends annular integral flanges 42b. Each ring 41 is formed with four openings 41a. Preferably, each ring 41 is constructed of aluminium. As is seen from FIG. 4B, upon assembly, the mounting rings 41 are secured respectively to the base plate 12 and the second holder 23 by means of bolts 43, which pass through the openings 41a, having the flanges 42b tightly put therebetween. Due to provision of the O-rings 38 and 39, the interior of the bellows assembly 42 is assuredly sealed.

In the following, a method of producing the bellows assembly 42 will be described with reference to FIGS. 5A to 5G.

Figure 5A:
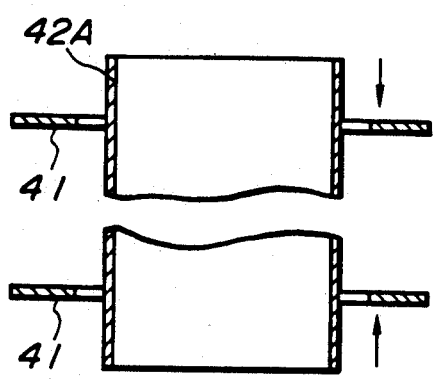
FIGS. 5A to 5G are sectional views which show the process for producing the bellows assembly of FIGS. 4A and 4B.
Figure 5B:
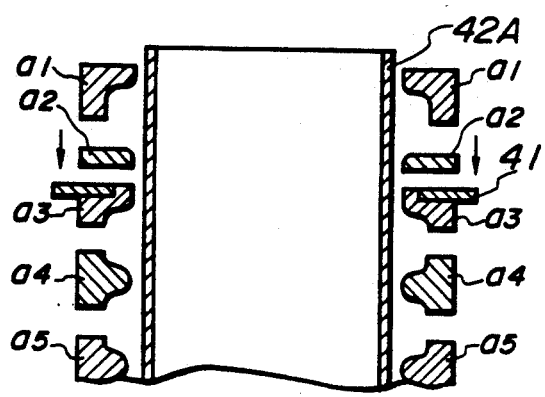
Figure 5C:
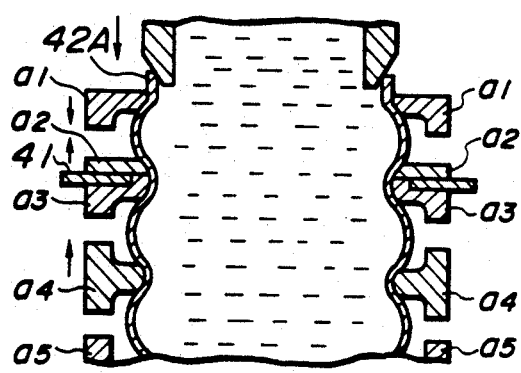
Figure 5D:
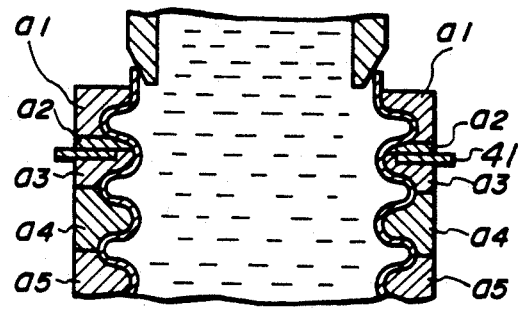
Figure 5E:
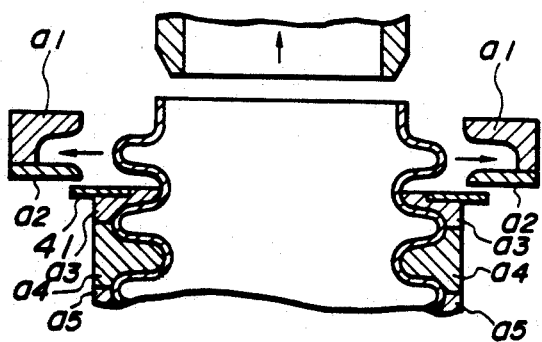
Figure 5F:
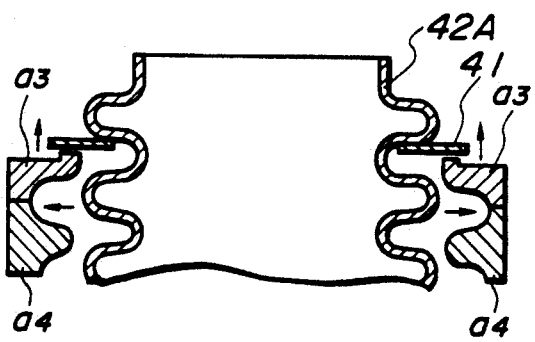
Figure 5G:
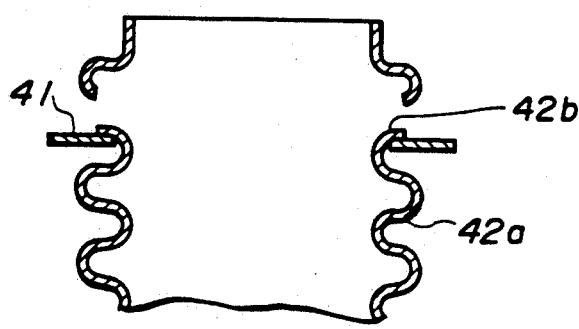

First, as is seen from FIG. 5A, a plurality of annular mounting rings 41 are received on an elongate tubular metal member 42A. Of course, each ring 41 is formed with four openings 41a. As is seen from FIG. 5B, these parts are then set in a hydraulically operated press machine having shaping blocks a1 to a5. Each shaping block is of a split mold. Then, as is seen from FIG. 5C, the press machine is so operated that the leading mounting ring 41 is grasped by the shaping blocks a2 and a3, and the interior of the tubular metal member 42A is filled with liquid and hydraulically pressurized. As is seen from FIG. 5D, during this hydraulic pressure application, the shaping blocks a1 to a5 are moved close to each other and stopped at the illustrated closed positions. The moving speed of the shaping blocks a1 to a5 is so controlled as not to produce cracks or a line in the tubular metal member 42A. With this, the tubular member member 42A is shaped to have a plurality of annular projections thereon. Then, as is seen from FIG. 5E, the divided parts of the shaping blocks a1 and a2 are moved radially outwardly to release the tubular metal member 42A. Then, as is seen from FIG. 5F, the divided parts of the remaining shaping blocks a3, a4 and a5 are radially outwardly moved and then the leading mounting ring 41 is axially moved upward in the drawing to a position to contact the uppermost annular projection, as shown. Then, as is seen from FIG. 5G, the uppermost annular projection of the tubular metal member 42A is cut. With this, the bellows 42a thus produced has at its upper end the integral flange 42b whose outer diameter is greater than the inner diameter of the ring 41. Then, substantially the same steps are carried out for providing the bellows 42a with a lower integral flange (not shown). Thus, the bellows assembly 42 thus finally produced has two annular mounting rings 41 which are movably held by the bellows 42a.

Figure 6:
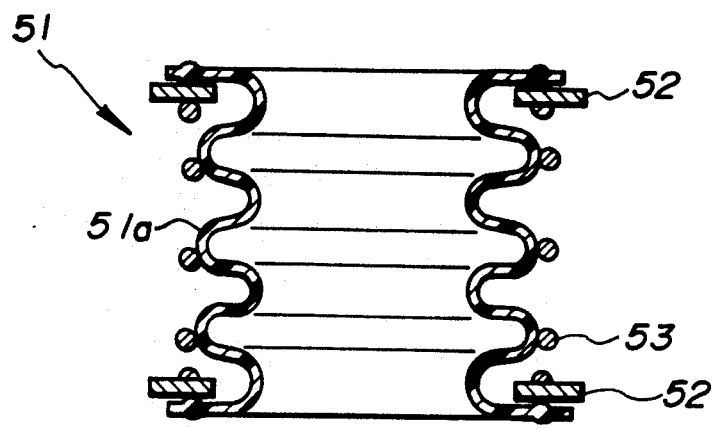
FIG. 6 is a sectional view of still another bellows assembly which is also usable in the present invention.
Figure 7:
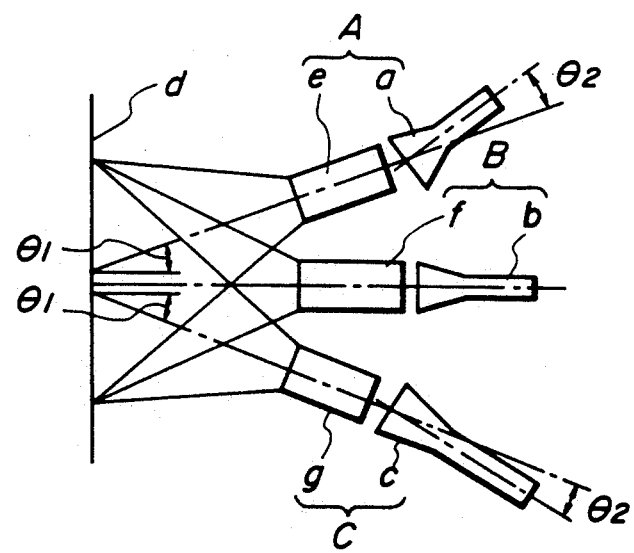
FIG. 7 is a drawing showing an arrangement of three image projecting units of a conventional projector.
Figure 8:
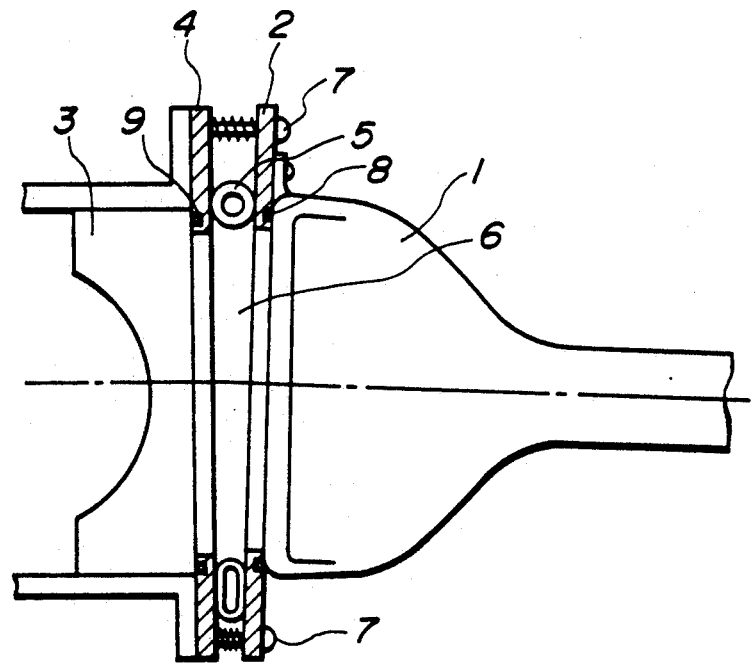
FIG. 8 is a sectional view of one of the image projecting units of the conventional projector.

Referring to FIG. 6, there is shown still another bellows assembly 51 which is also usable in the present invention.

The bellows 51a of this assembly 51 is constructed of rubber, plastic or the like. If desired, polyethylene terephthalate, polypropylene or the like may be used as the material of the bellows 51a. Two annular mounting rings 52 are used for connecting the assembly 51 to the proper positions. A coiled metal spring 53 is disposed about the bellows 51a to longitudinally expand the bellows 51a.

What is claimed is:

1. An image projecting unit comprising:
   a structure having a display surface on which a visual image is displayed;
   a lens assembly movably arranged in front of said display surface of said structure, said lens assembly having a rearmost lens which faces said display surface;
   a bellows disposed between said display surface and said rearmost lens to define therebetween a sealed space;
   liquid contained in said sealed space to optically connect said display surface and said rearmost lens; and
   universal mounting means for pivotably mounting said lens assembly to said structure and having said bellows disposed therebetween, said universal mounting means including adjusting screw means for pivoting said lens assembly in universal directions relative to said structure.

2. An image projecting unit comprising:
   a first structure having a display surface on which a visual image is displayed;
   a second structure having an opening formed therethrough, said second structure being secured to said first structure in such a manner that the display surface is exposed through said opening;
   a third structure positioned in front of said second structure and being movable in a fore-and-aft direction relative to said second structure;
   a fourth structure universally pivotally connected to said third structure;
   a lens assembly mounted to said fourth structure in such a manner that a rearmost lens thereof faces the display surface through said opening of the second structure;
   a bellows assembly disposed between said second and fourth structures to defined a sealed space to which said display surface and said rearmost lens are exposed;
   a liquid contained in said sealed space to optically connecting said display surface and said rearmost lens; and
   driving means for pivoting said fourth structure in universal directions relative to said third structure.

3. An image projecting unit as claimed in claim 2, in which said drive means comprises:
   a bolt extending between first given portions of said second and fourth structures, the distance between said first given portions being varied upon rotation of said bolt about its axis; and
   another bolt extending between second given portions of said second and fourth structures, the distance between said second given portions being varied upon rotation of said another bolt about its axis.

4. An image projecting unit as claimed in claim 3, in which said first given portions and said second given portions are spaced by 90 degree in angle with respect to an axis which passes through a center of the opening of said second structure and a center of the rearmost lens of said lens assembly.

5. An image projecting unit as claimed in claim 4, in which each of said bolts of said drive means has a rear end portion rotatably held by said second structure and a front end portion rotatably held by said fourth structure, and in which each of said bolts has a nut operatively engaged with the front end portion.

6. An image projecting unit as claimed in claim 5, in which said fourth structure is circular in shape and universally pivotally received in a substantially circular opening formed in said third structure.

7. An image projecting unit as claimed in claim 6, in which said fourth structure is divided into upper and lower parts by and between which the substantially circular opening is defined.

8. An image projecting unit as claimed in claim 7, in which outer peripheral surfaces of the circular fourth structure constitute convex surfaces which are slidably mated with concave recesses which are possessed by said upper and lower parts of said third structure.

9. An image projecting unit as claimed in claim 8, in which the circular fourth structure has a circular opening formed therethrough, said lens assembly being connected to said fourth structure in such a manner that the rearmost lens thereof is mated with said circular opening of said fourth structure.

10. An image projecting unit as claimed in claim 9, further comprising position adjusting means which positions said upper and lower parts of said third structure relative to said second structure.

11. An image projecting unit as claimed in claim 10, in which said position adjusting means comprises:
    a bolt extending between third given portions of said second structure and the upper part of said third structure, the distance between said third given portions being varied upon rotation of said bolt about its axis; and
    another bolt extending between fourth given portions of said second structure and the lower part of said third structure, the distance between said fourth given portions being varied upon rotation of said another bolt about its axis.

12. An image projecting unit as claimed in claim 11, in which said second structure has forwardly extending upper and lower plate portions, said plate portions being formed at their inside surfaces with respective guide grooves with which said upper and lower parts of said third structure are slidably engaged.

13. An image projecting unit as claimed in claim 2, in which said bellows assembly comprises:
    a bellows proper having front and rear ends;
    two mounting rings through which said front and rear ends of said bellows proper are connected to said fourth and second structures.

14. An image projecting unit as claimed in claim 13, in which said bellows proper is constructed of a resiliently deformable metal.

15. An image projecting unit as claimed in claim 14, in which said bellows is constructed of steel, stainless steel, phosphor bronze or berylium.

16. An image projecting unit as claimed in claim 13, in which said bellows is constructed of rubber, polyethylene terephthalate or polypropylene.

* * * * *